UNITED STATES PATENT OFFICE.

EDWARD W. WOLFE, OF PITTSBURG, PENNSYLVANIA.

IMPROVEMENT IN BOTTOMS FOR REHEATING AND WELDING FURNACES.

Specification forming part of Letters Patent No. 149,905, dated April 21, 1874; application filed March 31, 1874.

*To all whom it may concern:*

Be it known that I, EDWARD W. WOLFE, of Pittsburg, in the county of Allegheny and State of Pennsylvania, have invented a new and useful Improvement in Bottoms for Reheating and Welding Furnaces; and I do hereby declare the following to be a full, clear, and exact description thereof.

This invention relates to improvements in that class of furnaces known as reheating and welding furnaces, employed in heating iron bars or slabs in the manufacture of welded pipes, and whenever metal is to be reheated for forming or working. My invention consists in the application of certain materials in the construction of furnace-bottoms—that is to say, in constructing the bottom of reheating furnaces from the material employed in making seggars, or from waste seggars, or seggars that have become useless as such, said material being preferably treated by a wash or slip of white or red lead, feldspar, flint, &c., as hereinafter more specifically set forth.

Furnace-bottoms of this class have heretofore been formed of sand, gravel, and similar material, which gave rise to cinder, burned out rapidly, and caused much loss of time in repairing. The object of this invention is to overcome said difficulties and produce bottom which will not cut or unite with the iron, will wear better than any heretofore known, and does not affect the iron or form cinder.

To enable others skilled in the art to which my invention appertains to make and use it, I will now proceed to specifically describe the same.

In baking the stoneware a cylindrical, oval, or other shaped case is used to protect the ware from the injurious effects of the products of combustion, and such case is known as a "seggar". It is composed for the most part of fire-clay, to which fragments of old seggars may be ground and added together with crushed-quartz sand, the whole, while in a plastic condition, being molded into shape and coated with a slip or wash of red lead, spar, and flint. At every firing more or less of these seggars become useless from various causes, the useful seggars lasting but a few times.

This waste material I propose to use in the manner and for the purpose stated, because it is the most readily available and cheaply obtained, but it is evident that the same material may be directly produced for the purpose by the method, and from the fire-clays, &c., used in the manufacture of seggars.

After the seggars have become useless as such, I take them and break them in small pieces, varying in size from a hickory-nut to a walnut, and even larger. These pieces I use in forming the furnace-bottom, preferably first subjecting them to a wash or slip composed of red or white lead, about sixty (60) parts, feldspar twenty-seven (27) parts, and flint twenty-five (25) parts. These fragments are spread upon the furnace to the required depth, and flux under the heat, forming a smooth bottom over which the iron glides easily and smoothly. When the seggar material is made especially for this purpose, it can of course be fashioned in any shape that can easily and readily be broken into fragments of the specified size, said fragments being subsequently treated by the slip or wash before use.

Having thus described my invention, I claim—

A furnace-bottom for reheating, welding, and other furnaces, composed of the material substantially as specified.

In testimony whereof I, the said EDWARD W. WOLFE, have hereunto set my hand.

EDWARD W. WOLFE.

Witnesses:
JAMES I. KAY,
F. W. RITTER, Jr.